May 3, 1938. B. GRANBERG ET AL 2,116,262
ATTACHMENT FOR MACHINE TOOLS
Filed May 8, 1935 4 Sheets-Sheet 1

Inventors:
Bengt Granberg
& John B. Sinderson
By Axel Ahlgren
Atty.

Inventors:
Bengt Granberg
& John B. Sinderson

Patented May 3, 1938

2,116,262

UNITED STATES PATENT OFFICE 2,116,262

ATTACHMENT FOR MACHINE TOOLS

Bengt Granberg and John B. Sinderson, Rockford, Ill., assignors to Sundstrand Machine Tool Co., Rockford, Ill., a corporation of Illinois Application May 8, 1935, Serial No. 20,349

17 Claims. (Cl. 82—19)

The invention relates generally to machine tools and particularly to an oval turning attachment for lathes.

The adoption of an oval piston by the automobile manufacturers created a difficult problem in the diamond turning of such pistons. While round pistons can be diamond turned at an efficient speed, and result in a piston having a clean surface superior to a ground piston, no construction has been devised up to the present time that can satisfactorily turn oval pistons at an efficient speed.

It is a primary object of the invention, therefore, to provide a novel and improved attachment for machine tools capable of diamond turning oval pistons at an efficient speed.

A more particular object of the invention is to provide an attachment of the character described having a pivotally mounted cam follower and tool holder supporting means of so little inertia as to be capable of oscillating with accuracy at a high frequency.

Another object is to provide an attachment of the character described having novel micrometer means for adjusting the attachment to turn pistons of different diameter from the same master cam.

Yet another object is to provide an attachment of the character described having means for raising or lowering the follower and tool holder relative to the horizontal diameter of the piston being turned.

More particularly it is an object to provide an attachment having a light cam follower and tool holder rigidly interconnected and pivotally mounted in a top plate which is supported on a bottom plate for angular adjustment about an axis perpendicular to the axis of the follower and holder, and is coupled to the bottom plate through a micrometer adjustment for varying the diameter of the piston being turned.

Other objects and advantages will become apparent from the following detailed description taken in connection with the accompanying drawings, in which:

Fig. 7 is a diametrical sectional view taken along line 7—7 of Figs. 2 and 6.

Figure 1:
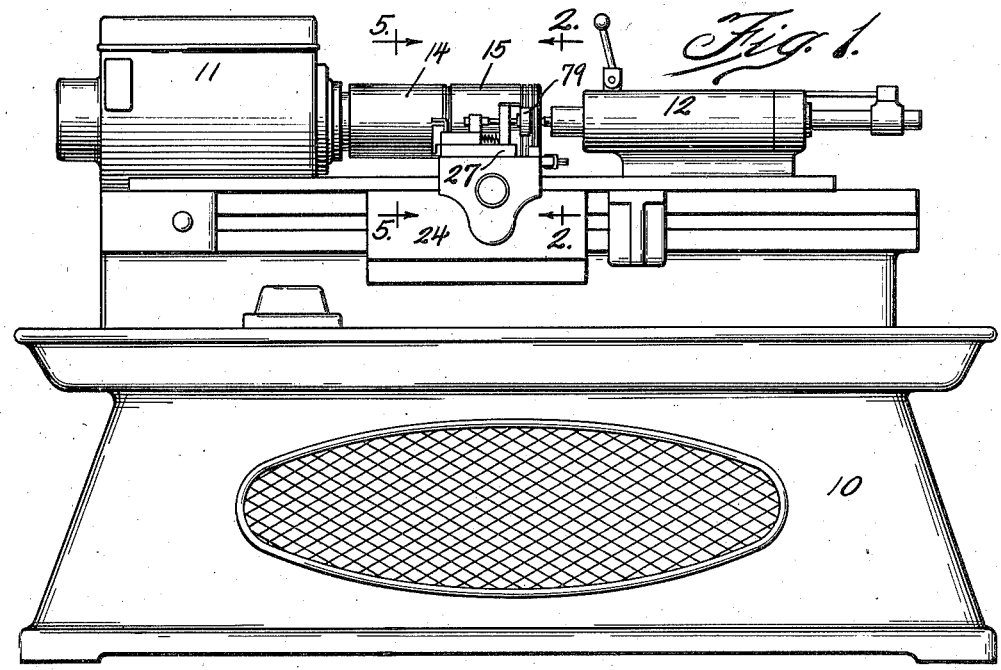
Fig. 1 is a front elevational view of a lathe equipped with an oval turning attachment embodying the features of the invention.

While the invention is susceptible of various modifications and alternative constructions, it is here shown and will be described hereinafter in a preferred embodiment, but it is not intended that the invention is to be limited thereby to the specific construction disclosed, but it is intended to cover all modifications and alternative constructions falling within the spirit and scope of the invention as defined by the appended claims.

In the drawings, the attachment is shown incorporated in a lathe having a bed 10, a headstock 11 at one end, and a tailstock 12 at the other end. Journaled in the headstock and projecting therefrom is a spindle 13 driven by suitable means located within the lathe. Supported on the projecting portion of the spindle, in axial alinement, are a barrel cam 14 and a piston 15 which is to be turned. The cam 14 constitutes a master cam or templet and to that end is shaped with the extent of oval to be imparted to the piston. A key 16 secures the cam against rotation relative to the spindle and a driver 17, secured by means of bolts 18 to the end of the spindle and formed with a flange 19 projecting radially outwardly thereof, engages the cam to secure it against movement axially of the spindle.

Figure 6:
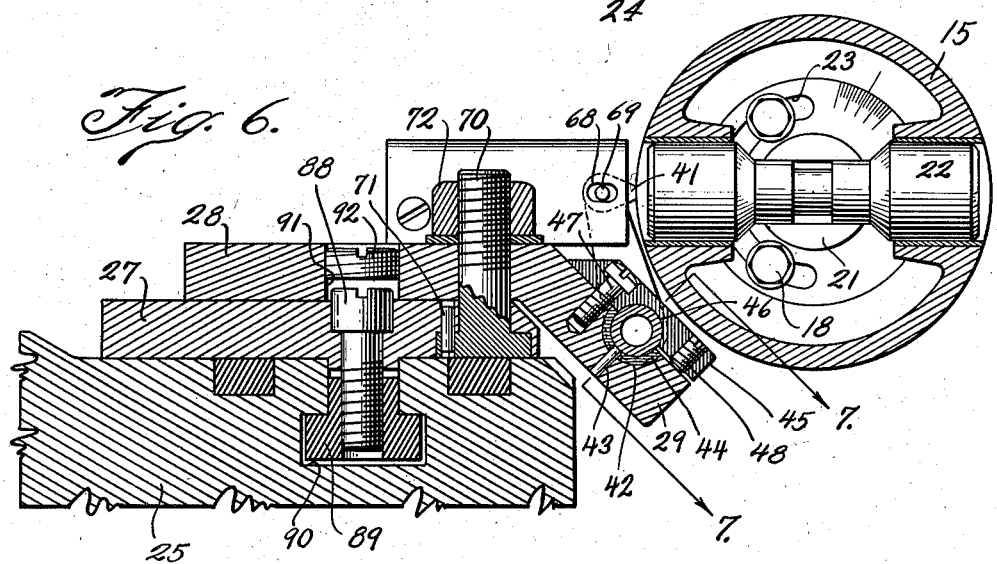
Fig. 6 is a vertical sectional view taken approximately along line 6—6 of Fig. 3.

The piston 15 is supported and centered at its open or skirt end by means of the large bullnose formed on the outer end of the cam against which the piston is urged by the tailstock 12, which engages in a center punch 20 to support and center the closed end of the piston. In order to assure that the piston will turn with the cam and in order that the axis of the oval may have the desired relationship relative to the wrist pin axis of the piston, the driver 17 is formed with a bifurcated end 21, best seen in Fig. 6, adapted to receive a wrist pin 22 inserted in the piston. Preferably the driver 17 is formed with arcuate apertures 23 through which the bolts 18, securing the driver, project, in order that the piston may be rotated relative to the cam so as to obtain the desired relationship of the axis of the oval on the piston to the axis of the oval on the cam.

The lathe is also provided with a carriage 24 movable longitudinally of the lathe by suitable means so as to obtain the desired feed of the tool across the work. This means has not been described because it forms no part of the invention and any well known drive may be employed.

The attachment proper comprises generally oscillating cam follower and tool holder supporting means, micrometer adjusting means for adapting the attachment to turn pistons of different diameter, and means for adjusting the cam follower and tool holder vertically relative to the horizontal diameter of the piston. The attachment is mounted on the carriage 24 for movement transversely of the spindle axis and to that end is formed with a base 25 sliding in dovetailed ways 26 extending transversely of the carriage. Mounted on the base 25 is a substantially rectangular bottom plate 27 which in turn supports a top plate 28 having a portion 29 projecting inwardly and downwardly. This inwardly and downwardly projecting portion in turn supports the cam follower and tool holder supporting means.

Figure 2:
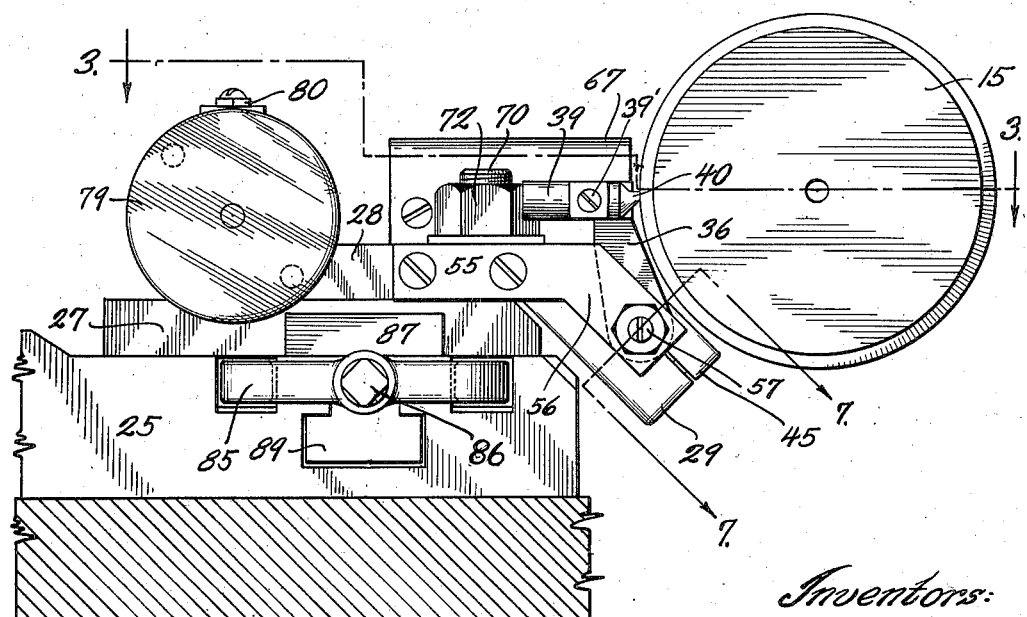
Fig. 2 is a sectional view taken along line 2—2 of Figs. 1 and 3.
Figure 5:
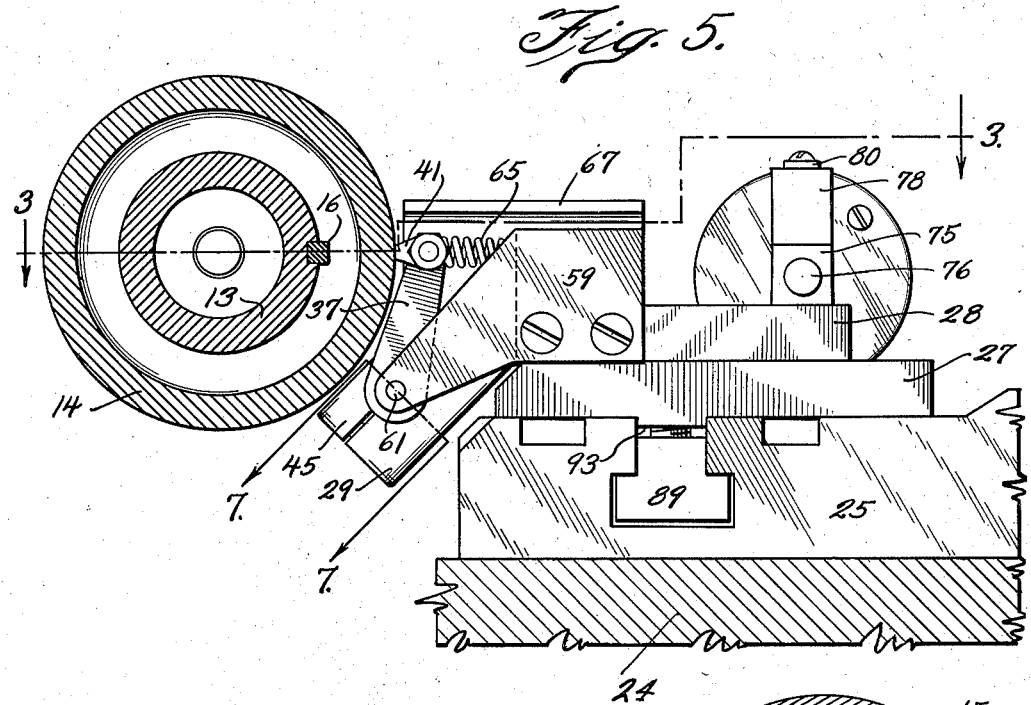
Fig. 5 is a transverse sectional view taken along line 5—5 of Figs. 1 and 3.

In the present instance the cam follower and tool holder supporting means is pivotally mounted on a horizontal axis normally extending substantially parallel with the axis of the spindle 13. In order that the means may be rugged, yet light, so as to be capable of following accurately the contour of the cam 14, it comprises a hollow shaft 35 having integral therewith at one end an arm 36 (see Fig. 2) and at the other end an arm 37 (Fig. 5). The arm 36 has pivotally secured thereto by means of a screw 38 a tool holder 39 adapted to receive a tool 40, while the arm 37 carries a cam follower 41. The tool has a cylindrical shank 40' to enable it to be rotated within the holder and is secured by means of a set screw 39'. Thus the tool may be rotated and the holder pivoted to obtain the best cutting position of the tool.

As previously stated, the downwardly projecting portion 29 of the top plate supports the shaft 35 and to that end is recessed at 42 to provide a bearing for the shaft. Secured in the recess 42 by means of pins 43 are two semi-cylindrical bushings 44 extending over a portion only of the length of the recess 42. The other half of the bearing in which the shaft 35 is journaled is formed by means of a cover 45 suitably recessed at 46 and secured to the portion 29 along one edge only by bolts 47. Along the other edge the cover carries two set screws 48 which abut against the portion 29 so that the tightness of the bearing may be adjusted accurately. The cover 45 is relieved at 49 opposite the space between the bushings 44 so as to reduce the area which is in engagement with the shaft. Preferably the bushings 44 are provided, in well known manner, with oil grooves so that the bearing surfaces may be well lubricated.

Figure 3:
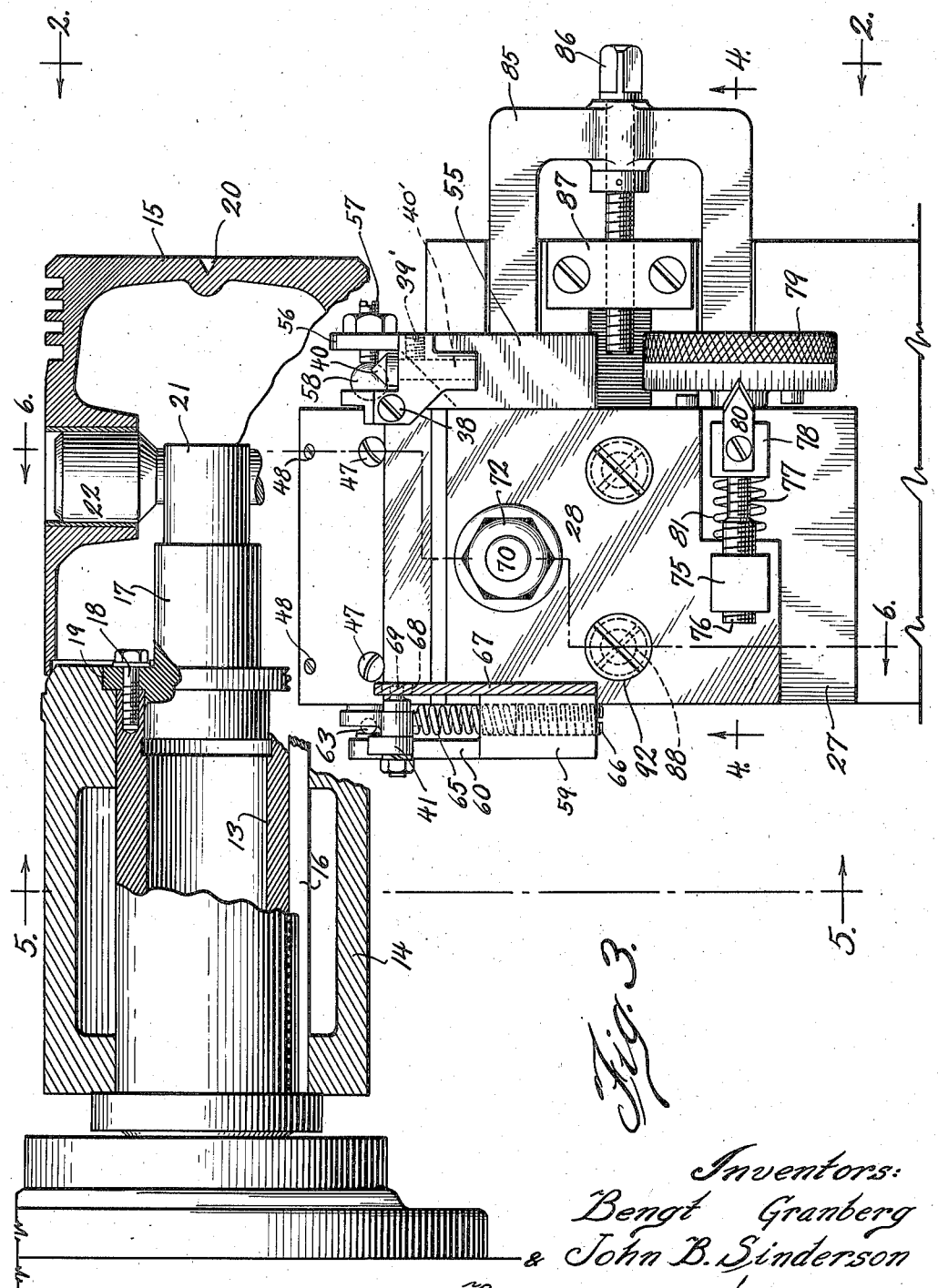
Fig. 3 is a view taken along line 3—3 of Figs. 2 and 5, with a portion of the cam and piston broken away better to reveal portions lying behind the same.
Figure 4:
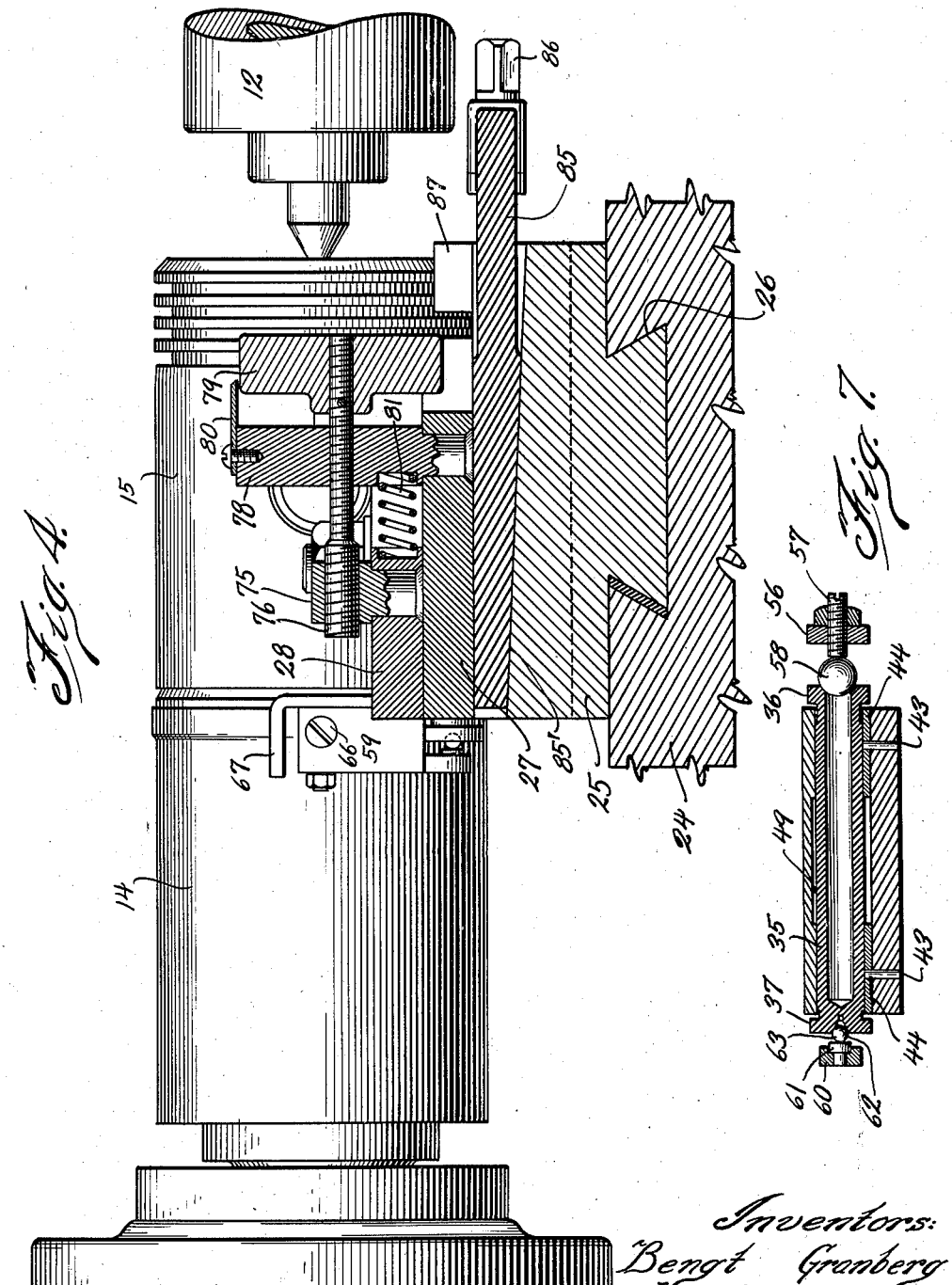
Fig. 4 is a vertical sectional view taken along line 4—4 of Fig. 3.

To counteract the end thrust on the shaft 35, there is secured to the top plate 28 a side plate 55 having a portion 56 projecting inwardly and downwardly parallel with the portion 29. At its end, the portion 56 carries a take-up screw 57 the inner end of which engages a ball thrust bearing 58 interposed between the screw and the adjacent end of the shaft 35. The shaft is open at the end and thus forms a seat for the ball 58. A generally similar side plate 59 is secured to the opposite side of the top plate and has a portion 60 carrying at its end a hardened button 61. The adjacent end of the shaft 35 is closed but is formed with a conical recess 62 forming a seat for a ball thrust bearing 63, smaller than the bearing 58, interposed between the end of the shaft and the button 61. The bigger bearing is disposed at the right end of the shaft, as seen in Figs. 1, 3 and 7, because feed of the carriage 24 commonly is from right to left and thus the greater end thrust is taken by the larger bearing. By use of the ball thrust bearings, backlash is eliminated with a minimum of friction.

The cam follower 41 is urged into contact with the cam 14 by means of a compression spring 65 bearing at one end in a recess formed in the side plate 59. The recess is closed by a screw plug 66 which is adjustable to vary the tension of the spring. An angle shield 67 is secured to the inside of the end plate 59 and extends over the top thereof to protect the spring against injury. The shield is formed with a slot 68 in which is received a stud 69 projecting from the arm 37, and the slot functions and is proportioned to limit the inward movement of the tool under the action of the spring 65 when the slide 25 is withdrawn by suitable mechanism at the end of the cutting operation to relieve the tool. It will be seen from the foregoing that the arm 37 will follow the contour of the cam 14 and that this movement will be transmitted to the tool 40 because of the rigid connection between the arm 37 and the arm 36 so that the tool will turn the piston to the same contour as the cam 14. Because of the extremely few parts composing the cam follower and tool holder supporting means, the disposition of such parts and the mounting thereof, the means has comparatively little inertia and thus can be made to oscillate accurately at the high frequency resulting when the spindle is driven at the speed required for efficient diamond turning of pistons.

In order that the attachment may be adjusted to turn pistons of varying diameter from the same master cam, the top plate 28 is supported for angular adjustment about an axis perpendicular to the axis of the shaft 35 and the spindle axis. Herein this axis is vertical and is formed by means of a bolt 70 projecting upwardly from the bottom plate 27 and through the top plate 28. Preferably the head of the bolt 70 is received in a recess formed in the bottom plate 27 and is secured against rotation by means of a pin 71. A nut 72 is threaded onto the bolt to secure the top plate in position once the attachment has been adjusted to turn a piston of the desired diameter.

A micrometer means is connected between the top plate and the bottom plate to obtain extremely accurate adjustment of the attachment. Rising from the top plate 28 is a post 75 bored and threaded to receive the enlarged portion 76 of an adjusting screw 77. The smaller portion of the screw 77 extends through a threaded post 78, rising from the bottom plate 27, and carries at its end a knob 79. The circumference of the knob 79 may be divided by suitable graduations and a pointer 80 mounted on the post 78 so as to indicate the extent of rotation of the knob. By actuating the knob in one direction the plate 28 is swung so that the tool 40 moves toward the piston while the follower 41 moves away from the cam resulting in the turning of a piston smaller than the cam, while rotation of the knob in the opposite direction results in the reverse movement of the parts and in the turning of a piston larger than the cam. A compression spring 81 interposed between the plate 28 and the post 78 takes up any play in the micrometer means.

Means is also provided herein for adjusting the cam follower and the tool vertically relative to the horizontal diameter of the cam and piston respectively. This means comprises a U-shaped wedge 85 interposed between the base 25 and the bottom plate 27, the base 25 being formed with an inclined surface 85' with which the wedge cooperates. At its intermediate portion the wedge has journaled therein one end of an adjusting screw 86, the other end being threaded into an adjusting block 87 bolted to the base 25. The bottom plate is secured to the base in adjusted position by means of bolts 88 extending downwardly through the bottom plate and threaded into a T-bar 89 positioned in a T-slot 90 formed in the base. Access to the bolts 88 is had through openings 91 in the top plate normally closed by means of screw plugs 92. The bottom plate is preferably formed with a rib 93 extending into the T-slot to aid in positioning the plate.

We claim as our invention:

1. In a machine tool having a headstock, a spindle projecting therefrom and carrying rotatably therewith in axial alinement an oval cam and a piston to be turned, an attachment for oval turning the piston comprising a supporting plate, a shaft journaled in said plate on an axis extending generally parallel with the axis of the spindle and having integral at each end a radially extending arm, a tool holder mounted on the end of one of said arms, a cam follower mounted on the end of the other of said arms, spring means urging said follower into engagement with the cam, a side plate on each side of said supporting plate, each having a portion terminating opposite the adjacent end of said shaft, a ball thrust bearing interposed between the ends of said shaft and the adjacent side plate, and an adjusting screw in one of said side plates bearing against the ball thrust bearing.

2. In a machine tool having a headstock, a spindle projecting therefrom and carrying in axial alinement an oval cam and a piston to be turned, an attachment for oval turning the piston comprising a supporting plate having a semi-cylindrical recess, a semi-cylindrical bushing secured in said recess near each end thereof, a cover having a semi-cylindrical recess therein and secured to said plate along one edge only, said cover having set screws along the other edge extending therethrough and adapted to abut said supporting plate, a shaft journaled in the bearing formed by said bushing and said cover and having integral therewith at each end radially extending arms, a tool holder carried at the end of one of said arms, a cam follower carried at the end of the other of said arms, and spring means urging said follower into engagement with said cam.

3. In a machine tool having a headstock, a spindle projecting therefrom and carrying rotatably therewith in axial alinement an oval cam and a piston to be turned, an attachment for oval turning the piston comprising a cam follower, a tool holder, oscillatory means rigidly interconnecting the same and supporting the same respectively opposite the cam and the piston, and means for adjusting said oscillatory means to turn pistons of different diameter from the same cam.

4. In a machine tool having a headstock and a spindle projecting therefrom and carrying rotatably therewith in axial alinement an oval cam and a piston to be turned, an attachment for oval turning the piston comprising a cam follower, a tool holder, a member rigidly interconnecting the follower and holder and pivotally mounted on an axis normally extending parallel with the spindle axis, and means supporting said member adjustable about an axis perpendicular to the spindle axis and the axis of said member to vary the diameter of the piston being turned.

5. In a machine tool having a headstock, a spindle projecting therefrom and carrying in axial alinement an oval cam and a piston to be turned, an attachment for oval turning the piston comprising a base member, a supporting plate mounted on said member for angular adjustment about an axis perpendicular to the axis of the spindle, a cam follower, a tool holder, oscillatory means rigidly interconnecting the follower and the tool holder and supporting the same respectively opposite the cam and the piston, and means including a micrometer screw interconnecting said base member and said supporting plate for pivoting the latter about its axis to vary the diameter of the piston being turned.

6. In a machine tool having a headstock, a spindle projecting therefrom and carrying an oval cam and a piston to be turned, an attachment for oval turning the piston comprising a base member, a supporting plate pivotally mounted on said member on an axis perpendicular to the axis of the spindle, a cam follower, a tool holder, oscillatory means rigidly interconnecting the follower and the tool holder and supporting the same respectively opposite the cam and the piston, a post rising from said base member and threaded to receive a screw, a post rising from said supporting plate and threaded to receive a screw of larger diameter, and a micrometer screw threaded into said posts operable upon rotation to effect pivotal movement of said plate to vary the diameter of the piston being turned.

7. In a machine tool having a headstock, a spindle projecting therefrom and carrying an oval cam and a piston to be turned, an attachment for oval turning the piston comprising a base, a plate supported above said base, a cam follower, a tool holder, oscillatory means rigidly interconnected and supporting said follower and holder, and means interposed between said plate and said base for bodily shifting said plate relative to said base to vary the position of said cam follower and tool holder relative to the horizontal diameter of said cam and said piston respectively.

8. In a machine tool having a headstock, a spindle projecting therefrom and carrying an oval cam and a piston to be turned, an attachment for oval turning the piston comprising a base, a bottom plate mounted immediately above said base, means for securing said plate to said base, a top plate supported on said bottom plate, oscillatory cam follower and tool holder means journaled in said top plate, and screw actuated wedge means interposed between said base and said bottom plate and adjustable by means of said screw to raise or lower said bottom plate relative to said base.

9. In a machine tool having a headstock, a spindle projecting therefrom and carrying in axial alinement an oval cam and a piston to be turned, an attachment for oval turning the piston comprising a base mounted for sliding movement laterally of the spindle, a bottom plate adjustably mounted on the base for movement axially of the spindle, a top plate mounted for pivotal movement about a vertical axis, a micrometer adjusting means connected between said plates for pivoting the top plate about its axis, means pivoted on an axis perpendicular to said vertical axis and generally parallel with the axis of the spindle having an arm at one end carrying a follower engaging said cam and an arm at the other end carrying a tool engaging the piston to be turned, and means for yieldably urging said follower into engagement with said cam.

10. In a machine tool having a headstock, a spindle projecting therefrom and carrying rotatably therewith in axial alinement an oval cam and a piston to be turned, an attachment for oval turning the piston comprising a base mounted for sliding movement laterally of the spindle, a plate carried by said base, oscillatory cam follower and tool holder supporting means mounted on said plate, micrometer means for adjusting said oscillatory means to vary the diameter of the piston being turned, and means for adjusting said oscillatory means to vary the position of the cam follower and tool vertically relative to the horizontal diameter of the cam and the piston respectively.

11. In a machine tool having a headstock, a spindle projecting therefrom and carrying an oval cam and a piston to be turned, an attachment for oval turning the piston comprising a base mounted for sliding movement laterally of the spindle axis, a plate carried by said base for pivotal movement about an axis perpendicular to the spindle axis, an oscillatory cam follower and tool holder supporting means pivotally mounted on said plate on an axis perpendicular to the axis of said plate, micrometer means for adjusting said plate about its axis to vary the diameter of the piston being turned, and means for adjusting said plate to vary the position of the cam follower and tool holder support vertically relative to the horizontal diameter of the cam and the piston.

12. In a machine tool having a headstock, a spindle projecting therefrom and carrying rotatably therewith in axial alinement an oval cam and a piston to be turned, and a tailstock for retaining the piston on the spindle, an attachment for oval turning the piston comprising a base mounted for sliding movement laterally of the spindle axis, a plate pivotally supported above said base on an axis perpendicular to the spindle axis, a cam follower, a tool holder, means rigidly interconnecting the cam follower and tool holder pivotally supported in the plate on an axis perpendicular to the axis of said plate and normally extending parallel with the spindle axis, means urging said interconnecting means to retain the cam follower in contact with the cam, micrometer means for pivoting said plate about its axis to vary the diameter of the piston being turned, and wedge means for moving said plate bodily with respect to said base to vary the vertical position of the cam follower and tool holder with respect to the horizontal diameter of said cam and said piston respectively.

13. In a machine tool having a headstock, a spindle projecting therefrom and carrying in axial alinement an oval cam and a piston to be turned, an attachment for oval turning the piston comprising a supporting plate, a shaft journaled in said plate and extending generally parallel with the axis of the spindle, each end of said shaft being formed with a seat centrally thereof, a side plate on each side of said supporting plate extending over each end of said shaft, a hardened insert in each side plate, and a hardened steel ball interposed between said inserts and the adjacent end of said shaft, one of said inserts being adjustable in a direction parallel to the axis of said shaft.

14. In a machine tool having a headstock, a spindle projecting therefrom and carrying rotatably therewith in axial alinement an oval cam and a piston to be turned, an attachment for oval turning the piston comprising a supporting plate, a cam follower disposed for engagement with the cam, a tool holder disposed for engagement of a tool thereon with the piston, only a shaft rigidly interconnecting said cam follower and said tool holder journalled in said plate and having an arm rigid therewith at each end, one of said arms carrying said cam follower and the other of said arms carrying said tool holder, and a spring urging said cam follower into engagement with the cam.

15. In a machine tool having a headstock, a spindle projecting therefrom and carrying rotatably therewith in axial alinement an oval cam and a piston to be turned, an attachment for oval turning the piston comprising a supporting plate, a shaft journalled in said plate and having integral at each end a radially extending arm, a tool holder mounted on the end of one of said arms disposed for engagement of a tool thereon with the piston, a cam follower mounted on the end of the other of said arms disposed for contact with the cam, spring means urging said follower and the tool into engagement with the cam and the piston respectively, means on the supporting plate terminating opposite each end of said shaft, and a thrust bearing interposed between each end of said shaft and the adjacent means on the supporting plate.

16. In a machine tool having a headstock and a spindle projecting therefrom and carrying rotatably therewith in axial alinement an oval cam and a piston to be turned, an attachment for oval turning the piston comprising a cam follower, a tool holder, a shaft rigidly interconnecting the follower and holder journalled with its axis normally extending parallel with the spindle axis, and means providing a journal for said shaft adjustable about an axis perpendicular to the spindle axis and the axis of said shaft for turning pistons of different diameters from the same cam.

17. In a machine tool having a headstock, a spindle projecting therefrom and carrying rotatably therewith in axial alinement an oval cam and a piston to be turned, an attachment for oval turning the piston comprising a supporting plate, a cam follower disposed for engagement with the cam, a tool holder disposed for engagement of a tool thereon with the piston, a shaft rigidly interconnecting said cam follower and said tool holder journaled in said plate and having an arm rigid therewith at each end, one of said arms carrying said cam follower and the other of said arms carrying said tool holder, said shaft being normally disposed with its axis parallel to the axis of the spindle, and means for adjusting said shaft with its axis oblique to the axis of the spindle in order to turn pistons of varying diameter from the same cam.

BENGT GRANBERG.
JOHN B. SINDERSON.